(12) United States Patent
Bleeker

(10) Patent No.: US 6,427,704 B1
(45) Date of Patent: Aug. 6, 2002

(54) METHOD OF CLEANING PRODUCTS TO WHICH DIRT ADHERES

(75) Inventor: Jan Jacobus Bleeker, Venhuizen (NL)

(73) Assignee: Cavo Latuco B.A., Utrecht (NL)

( * ) Notice: Subject to any disclaimer, the term of this patent is extended or adjusted under 35 U.S.C. 154(b) by 0 days.

(21) Appl. No.: 09/485,884

(22) PCT Filed: Aug. 18, 1998

(86) PCT No.: PCT/NL98/00467

§ 371 (c)(1),
(2), (4) Date: May 5, 2000

(87) PCT Pub. No.: WO99/08968

PCT Pub. Date: Feb. 25, 1999

(30) Foreign Application Priority Data

Aug. 18, 1997 (NL) .............................................. 1006789

(51) Int. Cl.[7] .............................. B08B 1/02; B08B 3/00
(52) U.S. Cl. .................... 134/25.1; 134/25.3; 134/25.5; 134/32; 134/37; 134/61; 134/67; 134/102.1; 134/102.2; 134/130; 134/134
(58) Field of Search .............................. 134/25.1, 25.5, 134/25.3, 32, 37, 61, 67, 102.1, 102.2, 130, 134

(56) References Cited

U.S. PATENT DOCUMENTS

| | | | |
|---|---|---|---|
| 2,426,398 A | 8/1947 | Lathrop | |
| 4,576,719 A | 3/1986 | Hurley et al. | |
| 5,645,092 A | * 7/1997 | Beaumont | ................. 134/102.2 |
| 6,082,548 A | * 7/2000 | Stephenson et al. | ........... 209/4 |

FOREIGN PATENT DOCUMENTS

JP         57094388         6/1982

* cited by examiner

*Primary Examiner*—Zeinab El-Arini
(74) *Attorney, Agent, or Firm*—Young & Thompson

(57) ABSTRACT

Solid products to which dirt adheres are cleaned by introducing them into a container filled with water, mechanically transporting the products through the container to form in the container a suspension of sludge in the water, the sludge comprising dirt which has been removed from the products, the sludge having a specific mass that approaches the specific mass of water. A stream of finely divided air bubbles is fed through the sludge suspension in the container thereby to lower the specific mass of the water and to cause sludge to move by gravity toward a lower section of the container. Sludge-enriched water is removed from that lower section of the container. The products are mechanically transported by a conveyor into and through and out of the container after dirt has been removed therefrom.

2 Claims, 2 Drawing Sheets

METHOD OF CLEANING PRODUCTS TO WHICH DIRT ADHERES

This is a national stage application of PCT/NL98/00467 filed Aug. 8, 1998.

FIELD OF THE INVENTION

The present invention relates to a method for separating sludge-like material and water, said sludge-like material hang a specific mass that approaches the specific mass of water, in which method a suspension, comprising water and sludge, is moved through a container.

BACKGROUND OF THE INVENTION

A method of this type is generally known in the prior art. The aim is to cause the sludge-like material to float to the top with the aid of flotation techniques and the material that is forced up is skimmed off with the aid of skimming equipment. Separate foaming agents and the like are needed for this purpose. The addition of said agents not only incurs costs, but frequently gives rise to farther contamination of the water, Other methods for separating sludge-like material and water comprise heating, as a result of which water is removed by evaporation and sludge-like material remains behind. A method of this type is particularly energy-intensive and has been proposed, for example, for concentrating manure-like materials.

From the Japanese patent application 57094388 a method is known to suppress and prevent the floating and concentrating of sludge. Removal of anaerobic gas is realised by subjecting sludge to flow of air. After aeration sludge is bent to a separate container for further processing.

OBJECT OF THE INVENTION

The aim of the present invention is to provide a method with which water and sludge-like material are essentially separated from one another without further chemicals or highly energy-intensive steps being required for this purpose.

SUMMARY OF THE INVENTION

This aim is achieved with a method as described in that a vertically ascending steam of finely divided air bubbles is fed through the sludge suspension in the container and in that a stream containing sludge-enriched fluid is drained from the lower section of the container.

The insight on which the invention is based is, in contrast to the prior art, not to make use of flotation for the sludge-like material but to lower the apparent specific mass of water by feeding in air, as a result of which settling of sludge takes place because the specific mass of the sludge is then higher. The sludge can then be discharged.

The method described above can be used, inter alia, for concentrating manure-like materials.

However, surprisingly it has been found that the method can also be used for cleaning products such as (flower) bulbs. Soil material always adheres to bulbs of this type and for export to certain countries the regulations lay down that there must be absolutely no soil material adhering to such bulbs. For this purpose, in the prior art, the bulbs are subjected to a spray-treatment with water under high pressure. Damage to the bulbs regularly occurs as a result and there is no guarantee that grains of sand and the like have also been completely removed from the bulbs.

Another method for cleaning bulbs is to introduce them into drums of large diameter, for example having a capacity of 15 $m^3$. These bulbs, such as lily bulbs, are cleaned using a sort of washing machine treatment. However, the sand present in water damages the bulb by etching into it. Moreover, this method produces large quantities of waste water for which there is no further use. Discharge is becoming increasingly less acceptable under current conditions.

By now feeding the bulbs, which, including the earth adhering thereto, have a specific mass that approaches the specific mass of water, through a bath in which rising air is moving, any soil material adhering to the bulbs is detached in a very gentle manner and brought into suspension and sludge material of this type precipitates by means of the mechanism described above.

It is possible to subject the sludge-enriched fluid to a further corresponding treatment, that is to say to pass it again through a bath with an air stream, as a result of which further concentration of the material can take place.

The invention also relates to a device for separating sludge-like material and water, comprising a container to be filled with water, which container is provided with feed means for said sludge-containing material.

According to the invention, the base of the container is provided with feed means for air, comprising perforated air feed elements, and a discharge for sludge arranged above these.

The device will be of different construction depending on the application of the method described above. When cleaning bulbs or other products, such products will be fed with the aid of a conveyor belt into a container which contains water or another suitable fluid. Air is passed through the container and the resulting deposit is discharged. The products are then removed from the container, likewise by mechanical means.

If, for example, manure has to be concentrated, it is not necessary to remove products from the container. After all, in this case there are, in principle, two waste streams, one containing concentrated sludge and the other containing treated fluid, such as water. However, it is possible to carry out a number of treatment steps and this is important especially in the case of the concentration of sludge-like materials. According to the invention, an assembly comprising a number of devices located downstream of one another in the direction of flow is proposed for this purpose.

Essentially the same quantity of water can still be used with the method now proposed. The quantity of moisture in the discharge sludge is relatively small. Consequently, small quantities of waste water are produced, which appreciably reduces the problems associated with cleaning. Pre-treatment and after-treatment devices can be located upstream and downstream of the device according to the invention. An example of a pre-treatment device which may be mentioned is a vacuum chamber with which adhering porous parts are detached. An after-treatment device can be a separator device in order to enable the used rinsing water to be recycled. An (infra red) drying device for the crop can also be provided.

BRIEF DESCRIPTION OF THE DRAWINGS

The invention will be explained in more detail below with reference to illustrative embodiments shown in the drawings. In the drawings.

DETAILED DESCRIPTION OF THE INVENTION

Figure 1:
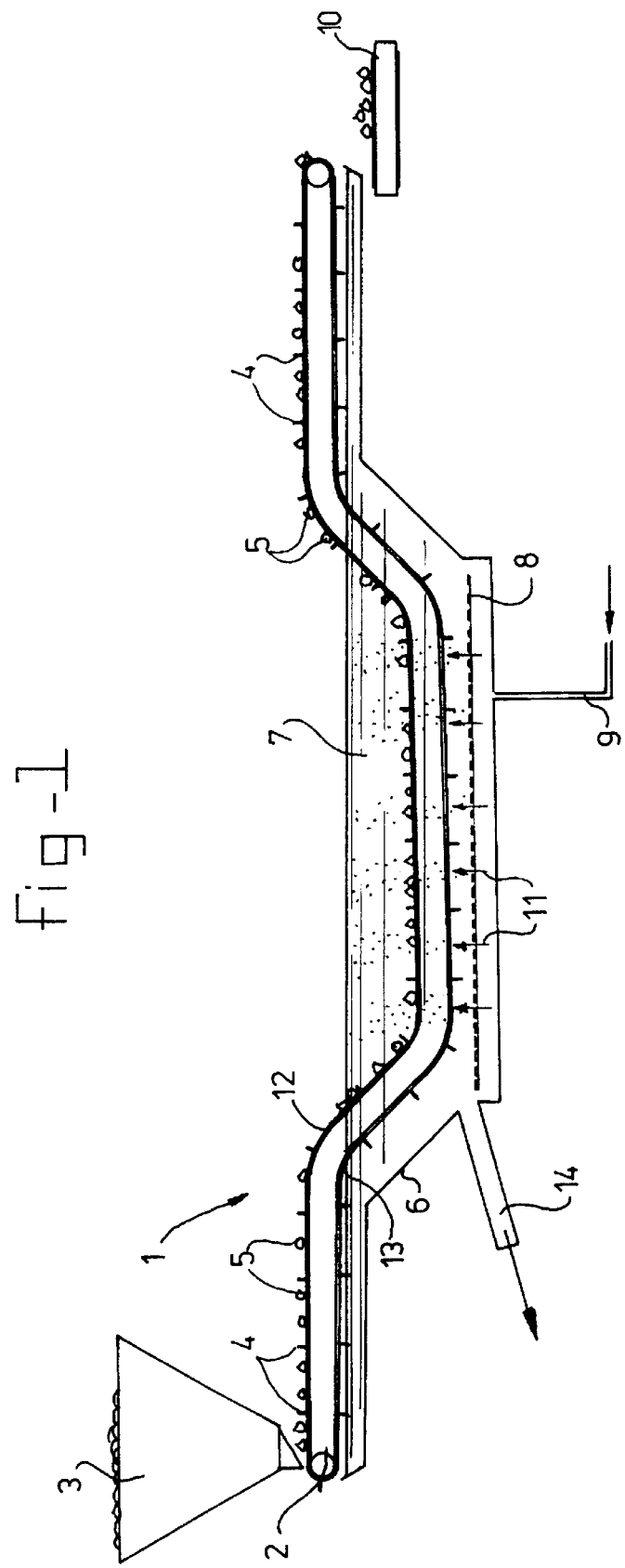
FIG. 1 shows, diagrammatically, a side view of a device for cleaning harvested bulbs.

FIG. 1 shows a device for cleaning bulbs. Said device is indicated in its entirety by 1. A conveyor 2 is fitted, onto which bulbs, indicated diagrammatically by 5, are placed via a feed 3. Conveyor 2 is provided with partitions 4 in order to hold the bulbs as far as possible in place, especially in the descending and ascending section of the conveyor. In the conveyor part 12 of conveyor 2 the bulbs are then introduced into a container 6. The latter is filled with water 7. There is a perforated base 8 in the underside of the container.

The perforated base is provided with perforations having a diameter of between 10 and 60 $\mu$m and more particularly 20 and 30 $\mu$m. The perforated plate can be made of stainless steel or plastic. Beneath the perforated plate there is a chamber through which air is introduced via feed 9. The air rises, as indicated by arrows 11, upwards through the perforated plate 8. Just above the perforated plate there is a discharge 14 for sludge. In a variant it is possible that the first section of the conveyor 2 is also below water level. By this means the fall of the crop onto the conveyor is softened by the water.

The bulbs, which are on the conveyor part 12, then move out of the container 6 and are deposited in collection bin 10.

The device described above functions as follows:

On movement of the bulbs, to which earth is adhering, in trough or container 6, said soil particles will be soaked gently away from the bulbs by the rising fine air bubbles. Because the specific mass of the water is relatively low as a result of the presence of air, the soil particles will immediately sediment out and be moved towards discharge 14 by the partitions 4 which are moving in the return part 13 of the conveyor 2. In this way, on the one hand, the bulbs are cleaned and, on the other hand, sludge is removed from the contaminated water.

Figure 2:
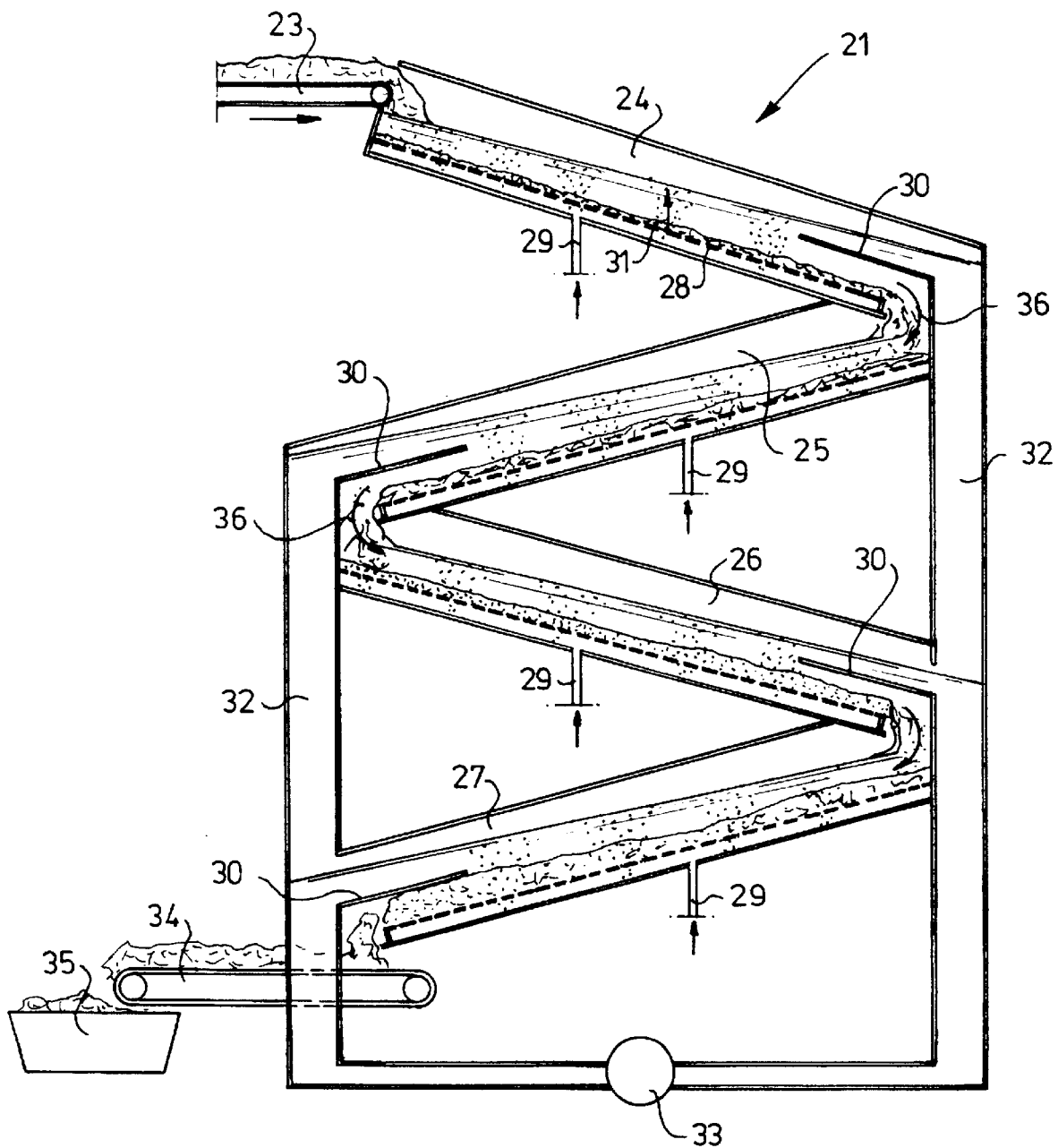
FIG. 2 shows, diagrammatically, a side view of a device for concentrating manure.

FIG. 2 shows a second application of the method according to the invention. The assembly shown in this figure is indicated in its entirety by 21. The assembly consists of a feed conveyor 23 and a number of linked separating chambers 24–27 arranged downstream thereof in cascade form. A screen 28 is fitted in each separating chamber. The screen has approximately the same characteristics as the perforated plate or screen 8. An air feed 29 is fitted below each screen. A splitter plate 30 is located in the lowest section of each separating chamber. The splitter plate 30 can have a fixed position or can be adjustable in height in order to vary the height with respect to the screen 28.

31 shows the path of the rising gas bubbles, originating from air feed 29.

Plate 30 provides for separation between sludge of relatively high specific mass (the underside) and relatively clean water, which is discharged via clean water discharge 32 to drain point 33. Arrow 36 indicates the direction of the discharged sludge.

There is a discharge conveyor 34, that emerges in container 35, for the relatively heavier sludge.

The device described above functions as follows:

A material to be cleaned, such as sludge, manure and the like, that contains a large proportion of water, is placed on feed conveyor 23 and the material is fed into the first chamber 24. The apparent specific mass of water is lowered by the rising gas bubbles, as a result of which the sludge settles out of the suspension with water and moves, in accordance with arrow 36, over the perforated plate 28 beneath plate 30 to chamber 25. The relatively cleaner water is fed directly to the clean water discharge 32. The same operation takes place in chamber 25, further concentration of sludge taking place. The same applies in the case of chambers 26 and 27. In this way concentration of the sludge material can take place without energy-intensive measures and without the supply of chemicals. The air supply can be achieved at relatively low pressure. In practice it has been found that adequate air can be transported through the water using a simple fan of relatively low power.

For those skilled in the art it will be immediately apparent from the completely different set-ups in the illustrative embodiments described above that numerous variants of the inventive concept are possible without going beyond the scope of the present application. Thus, for example, it is possible in the variant according to FIG. 2 to make the angle between the various chambers adjustable depending on the material to be processed. Furthermore, a wide variety of products can be treated, such as other agricultural products but, for example, also archaeological finds which have to be treated very carefully. It is therefore also intended that variants of this type fall within the inventive concept, as formulated in the appended claims.

What is claimed is:

1. A method of cleaning products to which dirt adheres, consisting of introducing said products into a container filled with water; transporting said products through the container to form in the container a suspension of sludge in said water, said sludge comprising dirt which has been removed from the products, said sludge having a specific mass that approaches the specific mass of water; feeding a stream of finely divided air bubbles through the sludge suspension in the container thereby to lower the specific mass of the water relative to the specific mass of the sludge whereupon the sludge moves toward a lower section of said container; removing sludge-enriched water from said lower section of said container; and transporting said products out of the container after dirt has been removed therefrom.

2. The method as claimed in claim 1, and further treating said sludge-enriched water to separate sludge therefrom.

* * * * *